(12) United States Patent
Gringeler et al.

(10) Patent No.: US 7,502,514 B2
(45) Date of Patent: Mar. 10, 2009

(54) SYSTEM AND METHOD FOR LOSSLESS COMPRESSION OF ALREADY COMPRESSED FILES

(75) Inventors: Yaakov Gringeler, Petach Tikva (IL); Darryl Lovato, Royal Oaks, CA (US)

(73) Assignee: Smith Micro Software, Inc., Aliso Viejo, CA (US)

(*) Notice: Subject to any disclaimer, the term of this patent is extended or adjusted under 35 U.S.C. 154(b) by 915 days.

(21) Appl. No.: 11/029,438

(22) Filed: Jan. 4, 2005

(65) Prior Publication Data

US 2006/0104526 A1 May 18, 2006

Related U.S. Application Data

(60) Provisional application No. 60/628,377, filed on Nov. 15, 2004, provisional application No. 60/628,376, filed on Nov. 15, 2004.

(51) Int. Cl.
*G06K 9/36* (2006.01)

(52) U.S. Cl. .................. 382/232; 382/233; 382/240; 382/248

(58) Field of Classification Search ............... 382/232, 382/233, 240, 244, 248, 234, 243; 341/51, 341/50, 86, 87, 63, 65, 106; 340/146.2; 348/222.1; 375/E7.198, E7.199; 707/100, 101
See application file for complete search history.

(56) References Cited

U.S. PATENT DOCUMENTS

| | | | | |
|---|---|---|---|---|
| 5,374,916 A | * | 12/1994 | Chu | 340/146.2 |
| 5,467,087 A | * | 11/1995 | Chu | 341/51 |
| 6,121,903 A | * | 9/2000 | Kalkstein | 341/63 |
| 6,192,155 B1 | * | 2/2001 | Fan | 382/232 |
| 6,574,372 B2 | * | 6/2003 | Ratnakar | 382/240 |

* cited by examiner

*Primary Examiner*—Anh Hong Do
(74) *Attorney, Agent, or Firm*—Craig M. Stainbrook; Stainbrook & Stainbrook, LLP

(57) ABSTRACT

A system and method for losslessly compressing already compressed files, such as JPEG files. The inventive method involves full or partial decompression of the original file, and re-compression using various advanced data compression techniques. Decompression involves decompression using the advanced techniques and re-compression using the original techniques. This method and system saves on data storage space and allows for the reconstruction of an original compressed file for use in applications that require or support the original compressed format.

13 Claims, 7 Drawing Sheets

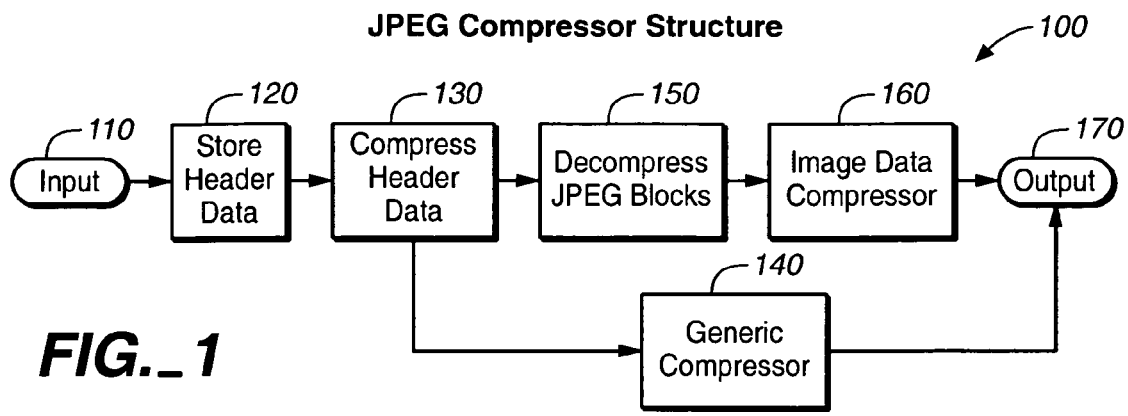
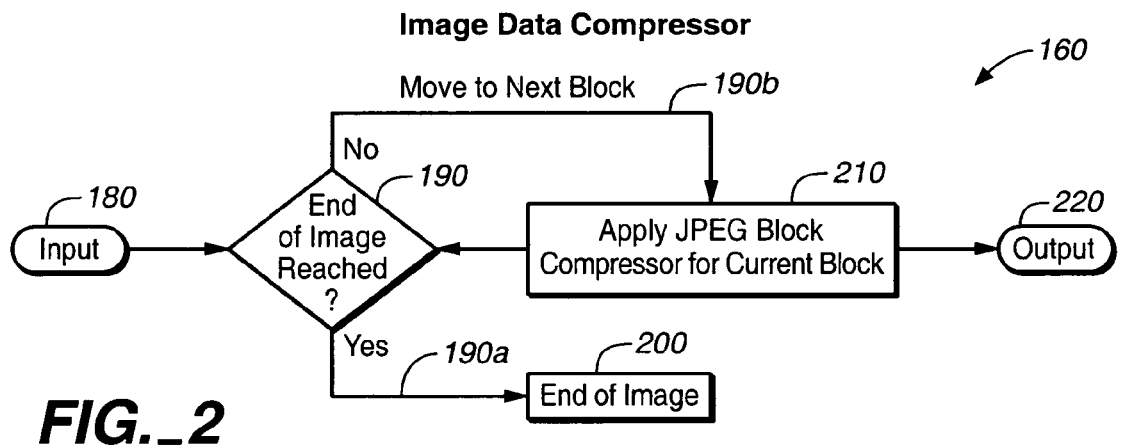
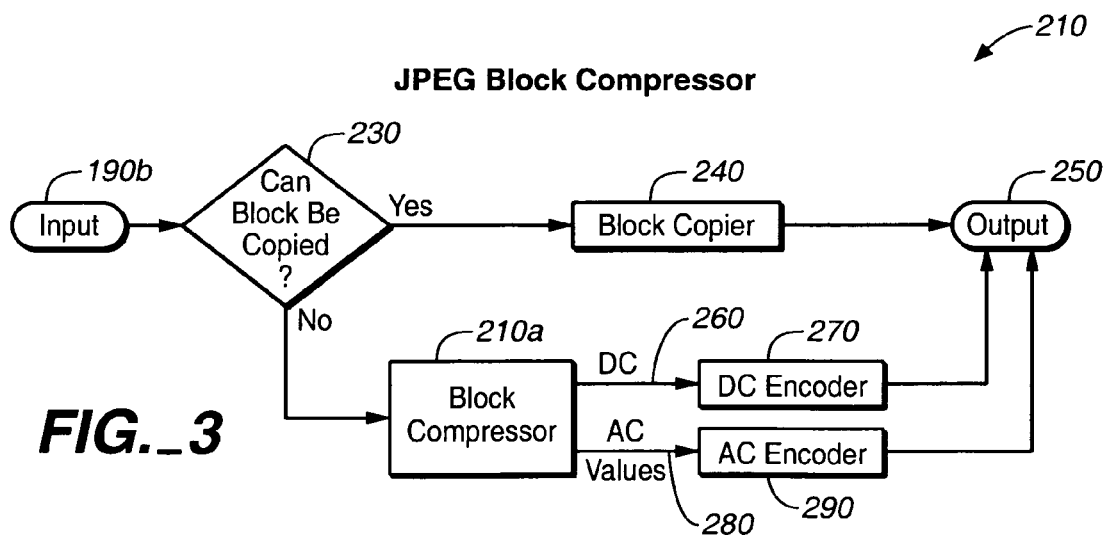

DC Encoder Structure
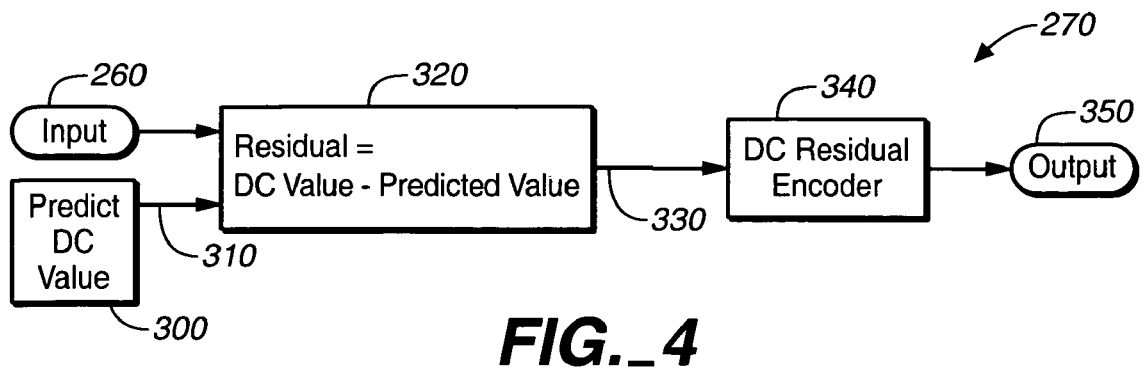
FIG._4
AC Encoder Structure
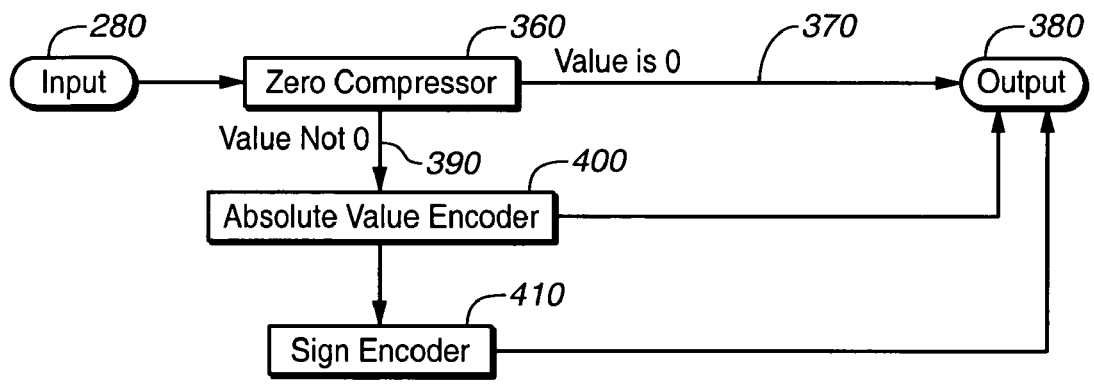
FIG._5
Audio/Image Recompression
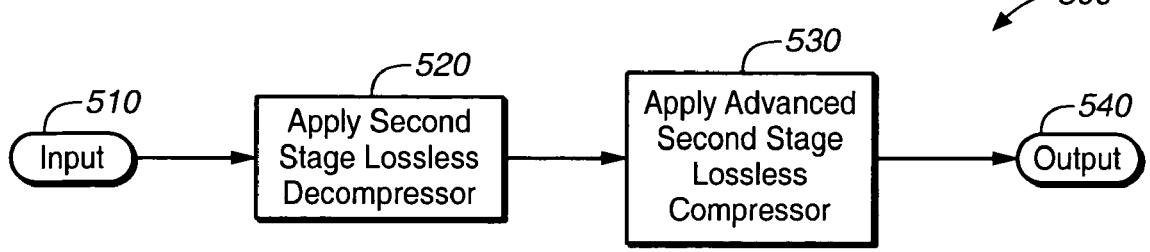
FIG._6

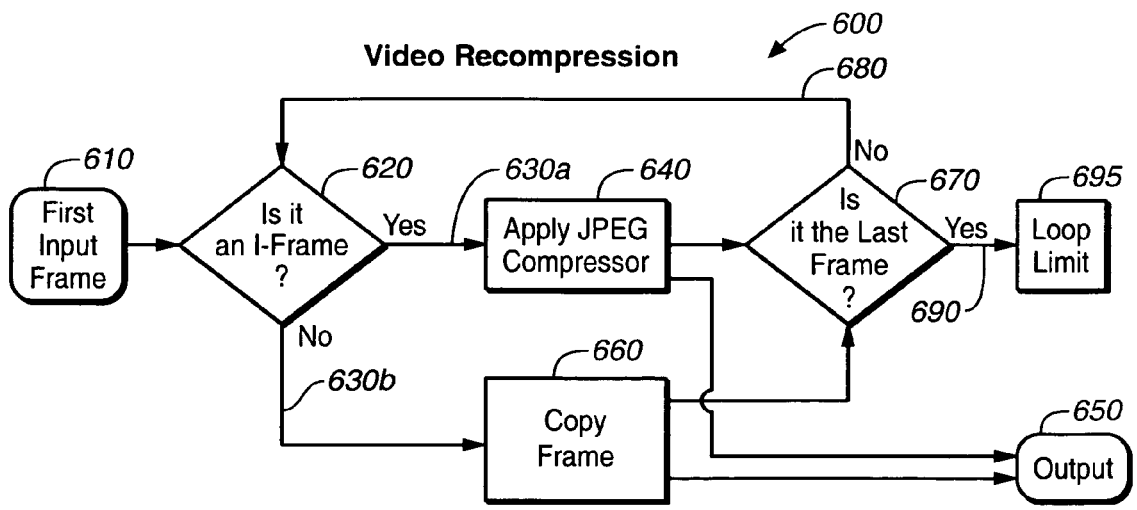
FIG._7
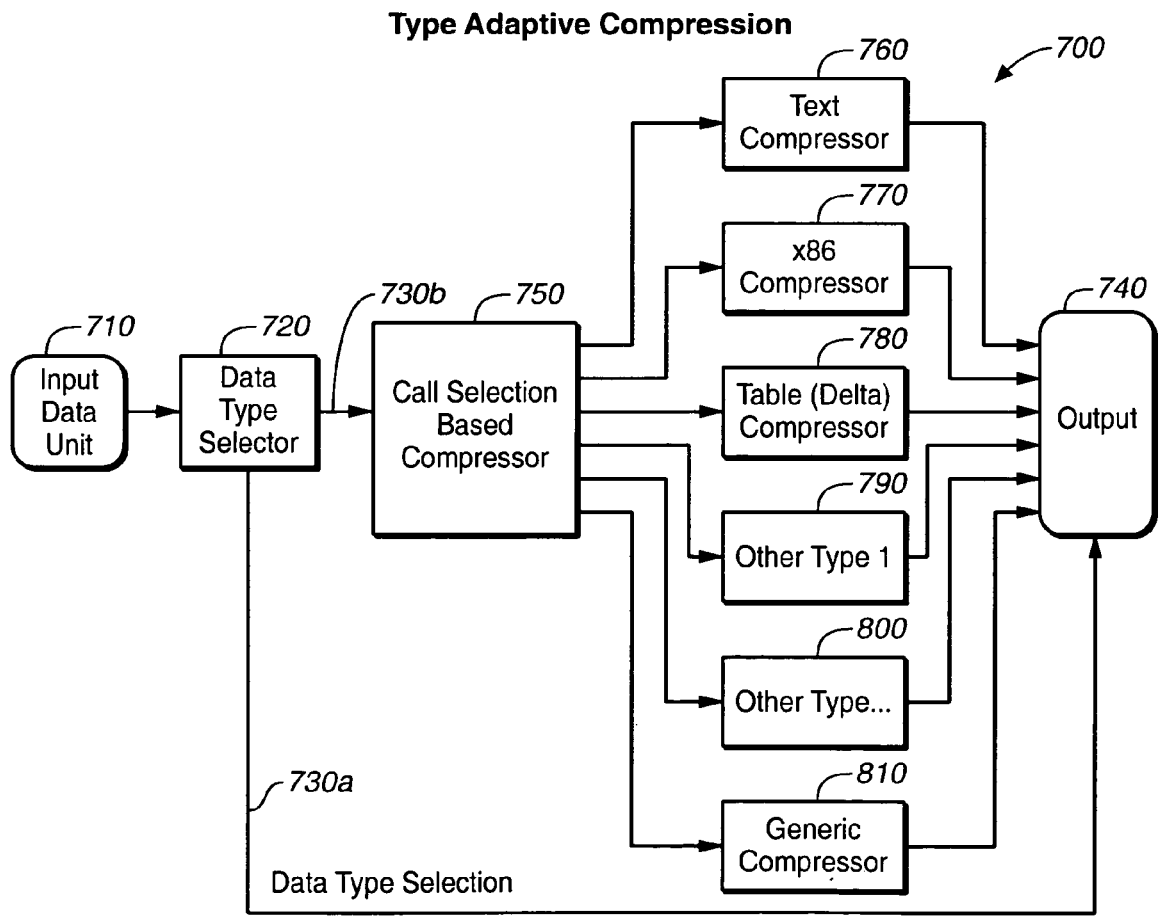
FIG._8

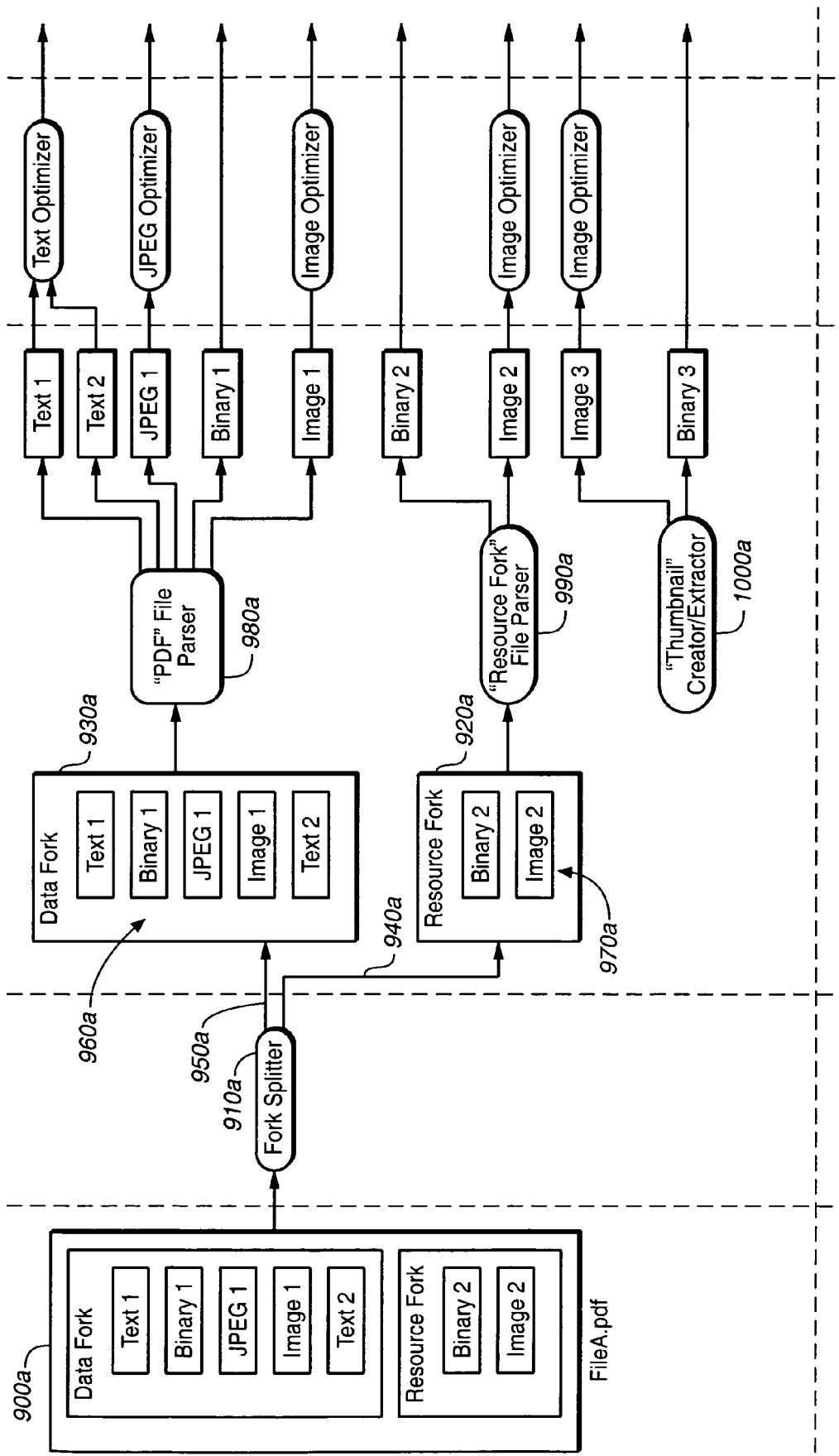

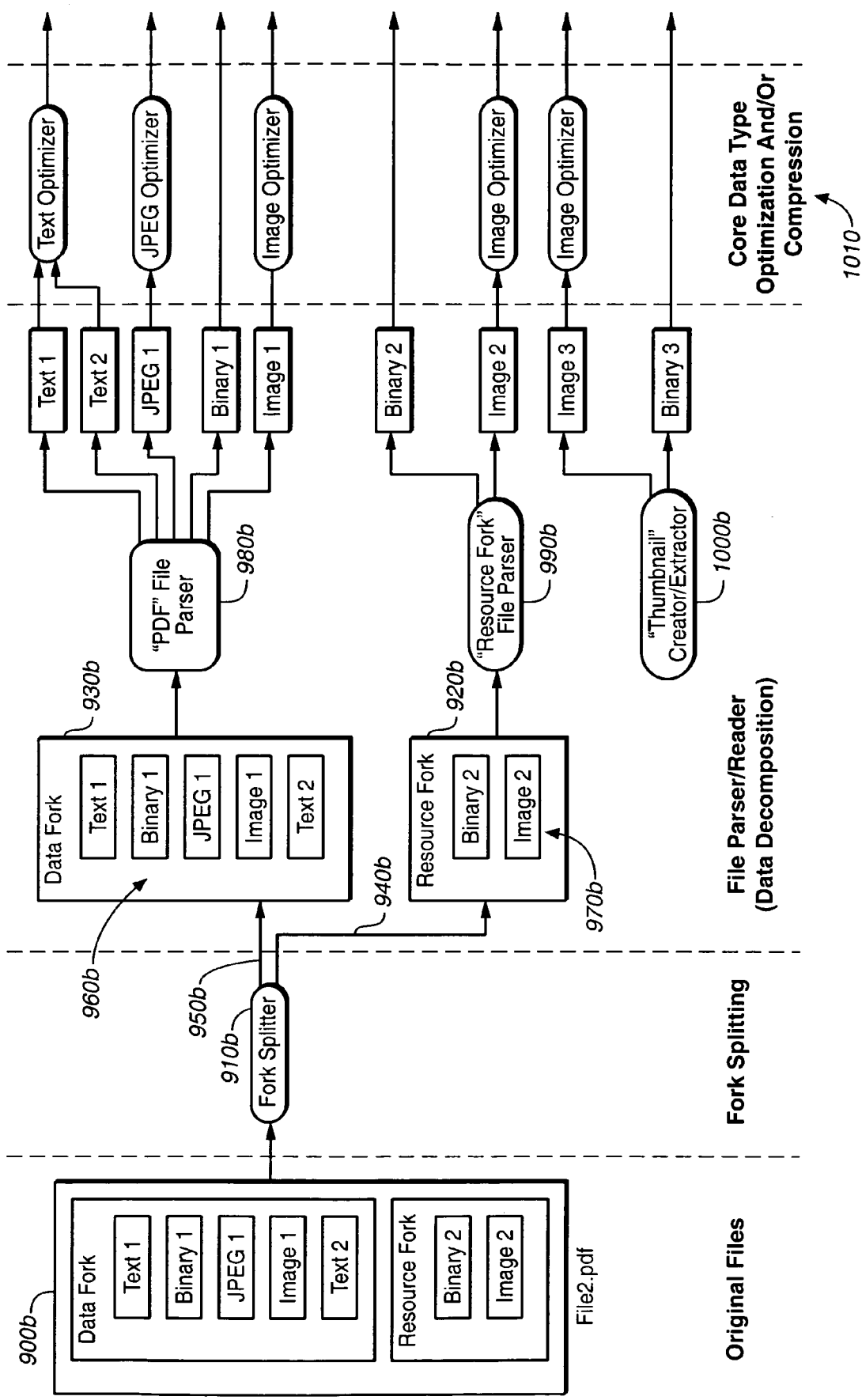
FIG._9C

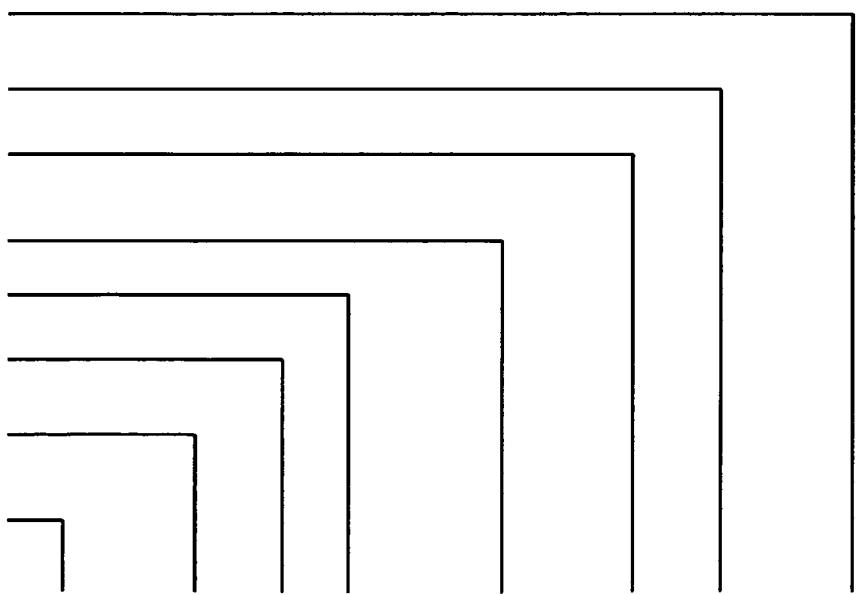

SYSTEM AND METHOD FOR LOSSLESS COMPRESSION OF ALREADY COMPRESSED FILES

CROSS REFERENCE TO RELATED APPLICATIONS

The present application claims the benefit of the filing date of U.S. Provisional Patent Application Ser. No. 60/628,377, filed Nov. 15, 2004, bearing the title, "Compressor of Already Compressed Files"; and U.S. Provisional Patent Application Ser. No. 60/628,376, filed Nov. 15, 2004, bearing the title, "Improvements to Lossless Image Compression."

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to data compression and decompression, file archiving, and streaming compression. More particularly the present invention relates to a system and method for the lossless compression and decompression of already compressed digital files, the system being particularly suited to the compression JPEG files and certain kinds of compound files containing multiple file types, such as PDF files.

BACKGROUND INFORMATION AND DISCUSSION OF RELATED ART

The use of data compression or encoding schemes to reduce the size of files for backup or file transmission is well known in the art. Many types of data and files are compressed, including images in the well known GIF and JPEG formats (though including many others), video in the MPEG format, sound in MP3 and other formats, as well as standard archive formats, such as SIT, ZIP, GZIP, and so forth. Furthermore, many types of files have compressed images embedded inside, e.g., PDF files, WORD documents, and the like.

Files and data streams that have been compressed using sub-optimal techniques now comprises a major part of existing data, both for storage and transmission. (As used herein "file" and "data stream" are used interchangeably to denominate an identified set of data elements which may exist in several forms, including in a discrete form, or combined or stored with other files, or embedded in another file as a file or as an object, or as a file containing other files, or as a data stream of determinate or indeterminate size, including information transmitted over a data channel.) Compressed files are frequently large, and despite the considerable advances made in mass-storage density, computer processor speeds, and telecommunication system performance, compression techniques do not yet satisfactorily solve the space and transmission bandwidth problems. Developers of compression technology are now hard pressed to keep pace with the rapid growth of multimedia web-based applications which utilize enormous amounts of data. It would be advantageous, therefore, to compress already compressed files even further. Moreover, it is desirable that such further compression be lossless.

It is generally considered "impossible" to meaningfully compress already compressed data. More accurately, perhaps, it should be said that it is considered impractical to compress already compressed data, though it is true that most attempts at compression of already compressed files fails altogether and actually results in an increase in file size. Attempts have been made to compress JPEG files, but current compression algorithms when applied to JPEG files generally achieve only a 1-2% improvement.

JPEGs provide a useful example to consider as candidates for further compression, firstly because the JPEG standard is universally accepted, and secondly because of the sheer size of typical JPEG files, and thirdly because existing generic compression algorithms cannot compress JPEG files as JPEG data streams are essentially random series of bytes. Moreover, JPEG files enjoy increasing popularity due to the advent and worldwide adoption of digital cameras and camera phones. Presently, JPEG shows every sign of continued, essentially unfettered growth.

JPEG is a lossy compression technique originally developed for continuous tone still images. The great majority of digitized still images are now stored in the JPEG format after being compressed by the JPEG compression technology. JPEG technology exploits the limitations of human visual sensitivity to chrominance, and discards a significant amount of chrominance information without compromising the quality of the image. Although the JPEG standard includes numerous compression options, one involves the elimination of three fourths (¾) of the chrominance information before applying several other compression techniques. This is a very simple kind of irrelevancy reduction. It alone reduces the size of the file to be compressed by half, and it is scarcely noticed, if at all, by the human visual system; that is, the degradation due to the loss of information is acceptable to, and not perceived by, most viewers. Another lossy compression method under the JPEG standard entails, in order, color space transformation, downsampling, discrete cosine transform, quantization, and entropy coding. The numerous JPEG options utilize a number of different redundancy reduction compression techniques having different rates of compression, with each successive rate producing a smaller, but increasingly degraded file. However, even after JPEG compression, file volume can still tax data transmission systems and computer processors.

Accordingly, the present invention provides a data compression system and method that losslessly compresses and decompresses JPEG files, among other file types. It must be emphasized that while JPEG itself is a lossy compression technology, the present inventive method of compressing JPEG files is lossless. No loss in addition to the loss created by JPEG is created when employing the present invention.

Further, the present invention provides means to compress a wide range of already compressed files by breaking a file down into its core data types, identifying and organizing the core data types, selecting an optimal compressor for the particular types, and then compressing the types in separate data streams.

BRIEF SUMMARY OF THE INVENTION

The present invention is a system and method of compressing already compressed files. The system and method, when applied to JPEG files, employs the following method steps:

(a) Encoding: The file is partially decompressed, up to the point where quantized blocks are reconstructed;

(b) Compression of the quantized blocks; and (c) Decoding in two steps, including:

(1) Decompressing the quantized blocks; and
(2) Compressing the quantized blocks using the method employed by the original compressor.

In the case of compressing JPEG files, it should be noted that the way the quantized blocks are compressed is novel, unrelated to the way in which JPEG compresses the blocks, is completely lossless, and achieves far better results.

It is therefore an object of the present invention to provide a new and improved system and method for lossless compression of already compressed digital files.

It is another object of the present invention to provide a new and improved method of compressing JPEG files.

It is still another object of the present invention to provide a new and improved method of compressing already compressed files, by decompressing the file, fully or partially, separating the file into its core data types, and then applying a compression method for each identified data type that is better than the type originally employed, when such a method is available.

Yet another object of the present invention is to provide a method to improve the compression of already compressed files by using multiple compression techniques, and adapting to each compressed unit of the file the one optimized for that type of data.

A still further object of the present invention is to provide a method to improve the compression of already compressed files by using solid mode compression.

Another object of the present invention is to provide a method to improve the compression of already compressed files by breaking heterogeneous data into homogeneous blocks and compressing each homogenous block as a separate data stream with a compressor superior to the one originally employed.

Yet another object of the present invention is to provide a method to compress audio, video, and image files which were compressed by a combination of lossy and lossless techniques by decompressing the lossless part and re-compressing it with a better lossless technique.

Still a further object of the present invention is to provide a method for compressing JPEG files losslessly, by performing partial JPEG decompression until the quantized post DCT blocks are reconstructed, and then compressing these blocks using a better lossless compression technique.

Another object of the present invention is to provide a method for compressing video files losslessly by performing full or partial decompression of I-frames and re-compressing them using advanced methods.

A still further object of the present invention is to provide a method of compressing JPEG DC values using multiple predictors based on values in neighboring blocks.

Another object is to provide a method to compress the JPEG DC value prediction residue using context based compression.

A still further object is to provide a method to compress JPEG AC values using context based compression.

Another object is to provide a method to improve the compression of JPEG AC values by coding separately their zero/non-zero state.

Another object is to provide a method to improve the compression of JPEG AC values by compressing the sign separately.

Yet another object is to provide a method to compress JPEG AC sign values using context based compression.

Still another object is to provide a method to improve the compression of JPEG AC signs by using predictors as part of the context.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a schematic flow diagram illustrating the general functional elements of the compressor of already compressed files of the present invention;

FIG. 2 is a schematic flow diagram showing the processing steps of the image data compressor;

FIG. 3 is a schematic flow diagram showing the processing steps of the JPEG block compressor;

FIG. 4 is a schematic flow diagram showing the DC encoder structure;

FIG. 5 is a schematic flow diagram showing the AC encoder structure;

FIG. 6 is a schematic flow diagram showing the processing steps in the audio/image recompression;

FIG. 7 illustrates the processing steps in video recompression;

FIG. 8 is a schematic flow diagram showing the type adaptive compression employed by the present invention; and FIGS. 9A-9D collectively comprise a detailed schematic view showing the processing steps for compression a pdf file with block mode.

DETAILED DESCRIPTION OF THE INVENTION

Figure 9B:
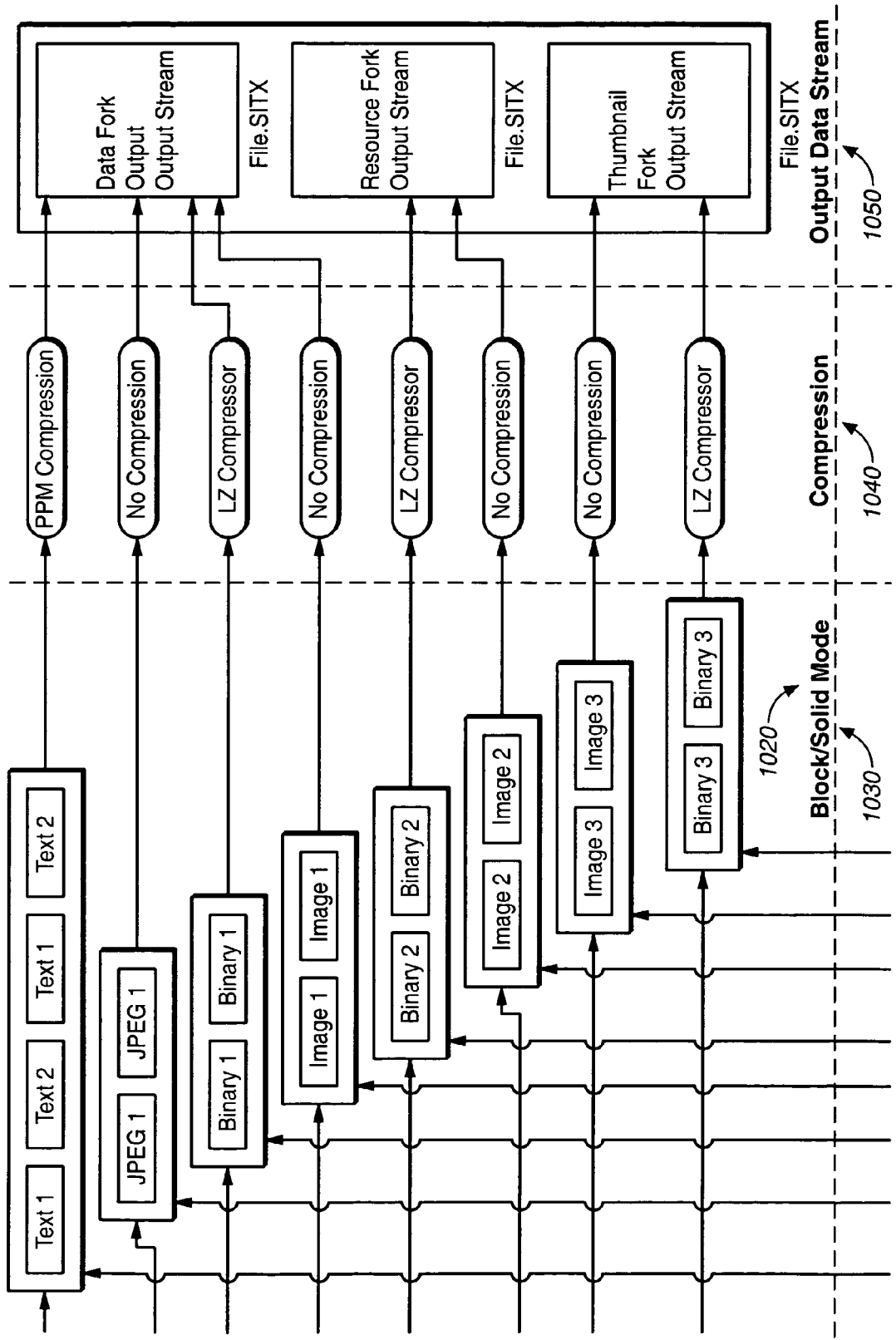

Definitions: As used herein, the term "file" means a named set of data elements stored in machine readable form, which may exist in several forms, including in a discrete form, or combined or stored with other files, or embedded in another file as a file or as an object, or as a file containing other files, or as a data stream of a determinate size, including information transmitted over a data channel.

Additionally, as used herein "JPEG" means any of a number of JPEG formats, including JPEG, JFIF, Exif JPEG, EXIF, and other JPEG-based file formats.

Referring to FIGS. 1 through 9, there is illustrated therein a new and improved system and method for lossless compression of already compressed files, generally denominated 100 herein. Using a JPEG file as an exemplary model, and referring now particularly to FIG. 1, the method begins by receiving input data 110 and storing header data 120 for future use. The header data is compressed 130 with a generic compressor 140. JPEG blocks are partially decompressed 150 to the point where quantized blocks are reconstructed. Next, the quantized blocks are compressed by an image data compressor 160 and sent into the data output stream 170.

Referring now to FIG. 2, the image data processor 160 proceeds in a loop through all of the processing steps in the following way: Image input data 180 from the decompression of the JPEG blocks is received and a determination is made 190 as to whether the end of the image has been reached. If the end of the image is reached 190a, no further compression is applied and the block is stored 200; if not 190b, then a JPEG block compressor 210 compresses that block using a compression algorithm more aggressive and superior to the originally employed compressor, the compressed block is then sent into the output stream 220.

Referring now to FIG. 3, the JPEG block compressor 210 of the image data compressor first determines whether the block can be copied 230. If yes, then it is copied by a block copier 240 and sent into the output 250. If not, then the block is processed by a block processor 210a, which compresses the DC coefficient 260 with a DC encoder 270 using a fully predictive model, and compresses AC values 280 with an AC encoder 290.

Referring now to FIG. 4, the DC value is predicted 300 with a calculation based on predictors derived from neighboring blocks, and the predicted value 310 is subtracted from the DC coefficient (Input) 260 to derive 320 the DC residue (prediction error) 330. The DC residue 330 is compressed by a DC residual encoder 340 using a context based model, and then passed to an output stream 350.

Referring now to FIG. 5, the AC values are compressed in the following way: First, the AC value is identified and coded as either a zero or non-zero value by a special "zero/non-zero" compressor 360. If the value is zero 370, then the AC value is already encoded and it is sent to output 380. For non-zero AC values 390, the absolute value is encoded by an absolute value encoder 400, comprising three separate compressors: one for values in the top row; one for values in the left column; and one for the remaining values. Next, the sign of the AC value is encoded by a sign encoder 410, and the result passed to output 380.

Decoding the compressed file involves two method steps to restore the file to its original compressed state, including: (1) Decompressing the quantized blocks; and (2) compressing the quantized blocks using the method employed by JPEG.

Accordingly, in a first preferred embodiment, the method to losslessly compress already compressed files of the present invention works by first decompressing the file, fully or partially, and then applying an improved compression method. The decoder starts by decompressing the file compressed by the advanced method. Next the original compression technique is applied and the original compressed file is therefore reconstructed.

FIGS. 6 and 7 show how the inventive method is applied to audio/image recompression 500 and video file recompression 600, respectively. It will be appreciated that the inventive method can be conceptualized as comprising two essential steps. Using an audio/image file as a first example, and referring now to FIG. 6, the compressed file (input) 510 is decompressed 520 by a second stage lossless decompressor. The decompressed data are then compressed by a second stage lossless compressor 530 and put into output 540.

Next, and now referring to FIG. 7, it will be seen that video files are recompressed by processing all input frames 610 in a loop. For each frame, a determination 620 is made as to whether the frame is an I-frame or not. If the frame is an I-frame 630a, a JPEG compressor 640 is applied, and the frame is compressed and passed to output 650. If the frame is not an I-frame 630b, the frame is copied 660 and passed to output 650. The process undergoes a last frame test 670 and continues 680 until the last frame has been processed 690 when loop limit 695 is reached.

In compound files containing multiple types of data elements, the inventive method uses multiple compression techniques and adapts to each compressed unit the one optimized for that type of data. Compression techniques which are optimized to specific types of data achieve better compression rates (for that particular type of data) than generic techniques and techniques optimized for a different type of data. In the present invention, the encoder analyzes the data and chooses techniques optimized for that type of data, if they exist. The compression technique which was used is encoded in the output stream. The decoder reads from the input stream the type of compression technique which was used to compress the data. It then applies the suitable decompressor.

Accordingly, referring now to FIG. 8, it will be appreciated that the method of the present invention is a type-adaptive compression system 700, which includes receiving an input data unit 710. A data type selector 720 then identifies the type of the input data-unit (e.g. PDF file, Word file, JPEG file, etc.) and breaks the unit into the core elements that reside within it. Information 730a on this data type selection is passed to the output 740. A selection-based compressor caller 750 then passes the core data units 730b that have been decomposed from the input data unit to an optimal compressor for that type of data. FIG. 8 shows various optimal compressors for illustrative data types, thus including a text compressor 760, an X86 (machine code) compressor 770, a table (spreadsheet) compressor 780, first and second "place holder" compressors 790, 800, that is, compressors of any of a number of suitable types, e.g., one or more image compressors, and a generic compressor 810. The output of each of these specialized compressors is passed to the output 740 of this section (which could be a generic compression algorithm, or directly stored in the archive).

Referring now to FIGS. 9A-9D, in a preferred embodiment of the improved method of compressing already compressed files of the present invention, the system preferably employs solid (block) mode compression. Because compressed files are frequently archive files that contain multiple individually compressed files, solid mode provides means to group files of the same type into one block and compress the block as a single unit. This method improves compression since it exploits redundancies among files, not merely the redundancies inside individual files. As a result, solid mode can provide a substantial improvement in compression rate. Thus, multiple files containing a plurality of core data types are addressed, for instance two pdf files 900a, 900b, firstly by employing fork splitters 910a, 910b, to split file forks, such as resource forks 920a, 920b, and data forks 930a, 930b, into separate resource and data compression streams, 940a, 940b, 950a, 950b. The core data types 960a, 960b within the data forks, e.g., text 1 and text 2, binary, JPEG, and image 1, and the core data types 970a, 970b within the resource forks, e.g., binary and image 2, are then further segregated by file-specific fork parsers (e.g. pdf fork parsers) 980a, 980b, and resource fork file parsers 990a, 990b, into specific data type compression streams. Thumbnail creator/extractors 1000a, 1000b, may be employed at this point if thumbnails are desired in an archived file.

After parsing, generally all but binary data is compressed and/or optimized 1010. After core data type optimization and/or compression, the data from each file is grouped in solid mode 1020 with like data types from other files into single blocks 1030. At this point file details in each block are encoded. The new blocks are then compressed 1040, as needed, by an optimal compressor selected for maximum file size reduction and/or compression rate, according to user specified parameters. The data is then passed to grouped fork output streams 1050, where it may be transmitted over a data channel or archived as desired.

When this method is applied to compression of already compressed files, a significant compression improvement is gained. The decoding step involves decompression of the solid blocks and reading of the details of the files in each block. Using the file details, the original files are reconstructed When utilizing the block mode method, the present invention preferably includes breaking heterogeneous data into homogeneous blocks. Compressed files are frequently heterogeneous, i.e., containing several types of data. For example, executable files typically contain machine code blocks, text, tables, and other types of data, such as images. Compression works best on homogeneous data. When mixed data types are compressed together, the compression is inferior to compression applied separately to the distinct types of data. Accordingly, the present method uses specialized techniques to separate heterogeneous data into homogeneous blocks before compression. The block separation details are encoded into the output stream. When this method is applied to compression of already compressed files, a compression improvement is achieved. Decompression of compressed heterogenous compressed files proceeds by decompressing the separate blocks and reading the details of the block separation from the input stream. Using the details of the block separation, the original file is reconstructed.

When compressed files that were compressed by a combination of lossy and lossless techniques are compressed using the method of the present invention, the method decompresses the lossless part and re-compresses it with a better lossless technique. Many compressed file formats use a lossy/lossless combination. The first stage of their compression process applies lossy techniques, which are typically adapted to the type of data being compressed. The output of the first stage is then compressed using a lossless technique. The lossless techniques typically used by such formats are old, optimized for speed and provide poor compression. When used on lossy/lossless compressed files, the present method works as follows: The original compressed file is partially decompressed. Only the lossless second stage of the compression process is reversed. This reconstructs the output of the lossy first stage. The output of the lossy stage is compressed using an advanced compression technique. The decompression process starts with decompressing the advanced technique. This reconstructs the output of the lossy first stage. The output of the lossy stage is then compressed using the original compression technique.

For instance, when employed to compress video files that were compressed by a combination of lossy and lossless techniques, including MPEG and variants, MOV, AVI, QUICKTIME and WMV, the method of the present invention decompress the lossless part and re-compress it with a better lossless technique. The lossless compression used by such formats is typically old and optimized for speed. The presently inventive method compresses such formats using the following process: The encoder starts by decompressing the lossless second stage of the original file. This reconstructs the output of the lossy first stage. The output of the lossy stage is then compressed using an advanced compression technique. The decoder starts by decompressing the advanced technique. This reconstructs the output of the lossy first stage. The output of the lossy stage is then compressed using the original compression technique.

The present invention can also be employed to compress audio files that were compressed by a combination of lossy and lossless techniques, such as MP3, OGG, and MIDI. Summarily, and as with the compression of video files compressed by a combination of lossless and lossy techniques, the lossless part of the audio file is decompressed and re-compressed with a better lossless technique. The lossless compression used by such formats is typically old and optimized for speed. In the method of the present invention, such formats are compressed using the following process: The encoder starts by decompressing the lossless second stage of the original file. This reconstructs the output of the lossy first stage. The output of the lossy stage is then compressed using an advanced compression technique. The decoder starts by decompressing the advanced technique. This reconstructs the output of the lossy first stage. The output of the lossy stage is then compressed using the original compression technique.

In the same manner that the present invention can be employed to compress audio and video files that were compressed using a combination of lossy and lossless compression techniques, the present invention can be employed to compress image files that were compressed by a combination of lossy and lossless techniques, such as JPEG, JPEG2000, DICOM, GIG, and TIFF. As above, generally the method is to decompress the lossless part and re-compress it with an advanced lossless technique. The present invention compresses the above-described formats and their variants by using the following process: The encoder starts by decompressing the lossless second stage of the original file. This reconstructs the output of the lossy first stage. The output of the lossy stage is then compressed using an advanced compression technique. The decoder starts by decompressing the advanced technique. This reconstructs the output of the lossy first stage. The output of the lossy stage is then compressed using the original compression technique.

In yet another aspect, the inventive method can be characterized as a method for compressing JPEG files losslessly by first partially decompressing the JPEG file until the quantized post DCT blocks are reconstructed, and then compressing these blocks using a better lossless compression technique.

In still another aspect, the present invention provides a method for compressing video files losslessly by using, among other methods, the method of performing full or partial decompression of I-frames and re-compressing them using advanced methods.

When employed to compress JPEG files, the present invention can compress JPEG DC by using multiple predictors based on values in neighboring blocks. Additionally, the JPEC DC value prediction can be compressed using context based compression. The JPEG AC values may be compressed using context based compression, either by using neighboring value as part of the context of JPEG AC values, values from neighboring blocks as part of the context of JPEG AC values, or by using predictors as part of the context of JPEG AC values. Further, the compression of JPEG Cr AC values is improved by using JPEG Cb AC values. The context based compression preferably uses different contexts for JPEG AC values in the top row, for JPEG AC values in the left column, and for the remainder of the JPEG AC values. The compression of JPEG AC values is improved further by coding separately their zero/non-zero state, and by compressing the sign of the AC values separately. Moreover, the compression of JPEG AC sign values is significantly improved using context based compression, and the compression of JPEC AC signs is further improved by using predictors as part of the context.

Encoder Details: In these latter two aspects, as a method for lossless compression of JPEG or video files, the encoder starts by reading, parsing and compressing the header section of the JPEG file. During the parsing stage, the encoder verifies that all relevant parameters are legal and supported. While parsing, the encoder also separately stores information it will need later for processing, especially the quantization tables, the Huffman tables and sampling factors.

All header information is compressed using a generic compressor. This compressor is a mixed model statistical compressor using order 0 with weight 1 and order 1 with weight 8.

After all relevant header data has been collected, the encoder calculates the amount of memory that it will require for compressing the blocks. This amount is a static portion needed for the compressors used to compress blocks and the memory needed to store the last 2 rows of blocks. The encoder then starts reading the blocks.

JPEG stores blocks in units. The size of a unit depends on the sampling factors. Due to the fact that the human eye is less sensitive to color than to amount of light, JPEG can (and usually does) discard of some of the chrominance information. The encoder supports horizontal and vertical sampling factors both being either 1 or 2. JPEG discards chrominance information by creating an 8×8 block which has the average values from a larger block, and keeping only the 8×8 block. If horizontal and vertical factors are both 1, a unit of blocks has 3 blocks, 1 luminance and 2 chrominance. If one sampling factor is one and the other is 2, a unit of blocks has 4 blocks, 2 luminance and 2 chrominance. If horizontal and vertical factors are both 2, a unit of blocks has 6 blocks, 4 luminance and 2 chrominance. If the image is gray-scale, only luminance information is stored and a unit of blocks has 1 block.

If the file is a progressive JPEG file, data is read in the order it is stored, and decompressed from its Huffman coding, The Huffman decompressed data is stored in internal buffers and subsequently encoded using an advanced method. The encoder then encodes the blocks in their JPEG order which is luminance blocks, then the Cb block and then the Cr block.

Most processing of the encoder occurs while encoding a block. Block encoding is the key and main part of the technology. JPEG encodes blocks using Huffman code and run-length encoding. The block encoding employed by the present invention starts by decoding the DC value from its JPEG representation. The value of the previous DC value of the same block type is then added to the DC value, since JPEG stores DC values as the difference between the DC value and the DC value of the previous block of the same type.

Next, the AC values are decoded from their JPEG representation, and the block is then de-zigzaged. At this point, a post-DCT quantized block has been fully reconstructed and the system starts encoding it. First the block is checked to determine whether it is identical to either the block above or the block on the left. If the block is identical, a code is encoded indicating that the block can simply be copied, and from where can it be copied. If the block can be copied, then there is no need to encode the block. If the block cannot be copied, the process continues.

To encode a block, the DC value is first encoded, followed by the AC values. The DC is encoded using a predictive model. It starts by predicting the DC value in the following way. Four different predictors are generated. Two are created from the DC values of the block above the current block and the block to the left. Two predict the DC values of the block below and the block to the right. Because the block below and the block to the right are not yet known, indirect predictors are used. The DC value of the block below is predicted using the block to the left and below, if available, or the block to the left otherwise. The DC value of the block to the right is predicted using the block to the right and above, if available, and the block above otherwise. Different weights are assigned to each predictor based on the likelihood for each of them to predict the DC value. The final predictor of the DC value is the weighted average of the predictors.

Once the predictor is generated, the difference between the predictor and the real DC value is calculated the difference encoded. The difference is encoded using a specialized context based compressor which uses as context the differences between the four predictors that were used to create the DC predictor and the sparsity of the blocks above and to the left of the current block. If the predictors are close to one another, it is more likely the prediction will be more accurate (small difference). This compressor exploits this by using the differences as context.

After the DC value has been encoded, encoding of AC values starts. AC values are encoded in a loop, from top to bottom and from left to right. Encoding of AC values uses, among other things, two predictors, an Up predictor and a Left predictor. The Up predictor is calculated based on the block above the current block and is updated by already encountered values in the current block. The Left predictor is calculated based on the block to the left of the current block and is updated by already encountered values in the current block.

JPEG blocks are quantized so that many of them are zeroed out. In many images, most values are zero. The present inventions uses a special "zero/non-zero" compressor to encode whether or not a value is zero. The zero/non-zero compressor is context based. It uses a mixed model with different contexts. The contexts use the following values: the block type, the position within the block, values from the current block, the quantization table, the Up and Left predictors, and for Cr blocks, the corresponding values from the Cb block.

If the AC value is non-zero, its absolute value is encoded. Three different compressors are used to compress AC values. One for value in the top row, one for values in the left column and one for the rest of the values. This reflects the different nature of these sets of values and the different ability to predict their values. Each of the three compressors is context based using mixed contexts. The contexts use the block type, position within the block, values in the same block, the Up and Left predictors, and in the case of a Cr block, the corresponding values from the Cb block. Each one of the compressors uses several contexts. For each context a weight is assigned. Statistics are kept for the values already encountered for the same context. A default distribution table is started for all possible values to prevent the possibility of a zero probability for a value that can occur, and the context statistics multiplied by the weight assigned to each context are added. The actual value is compressed based on this distribution table.

The absolute AC value is represented using a modified logarithmic scale so that values 1 to 5 have their own code with higher values having a code for the exponent with the mantissa being stored directly. Only the codes (1.5, exponents) are compressed. For every non-zero AC value, the sign is compressed separately. This is important because the compressibility of the sign is different than the compressibility of the absolute values. In particular, the Up and Left predictors, are good predictors for the sign. The compressor is context based and uses a mixed model. For the contexts it uses the block type, position in the block, values in the same block, values in neighboring blocks and especially the Up and Left predictors.

Once the sign is compressed, the AC value is fully compressed.

Once the loop completes, the post-DCT quantized block is fully compressed.

Decoder Details: For the most part, the decoder is symmetrical to the encoder. The decoder starts by decompressing and parsing the header section of the JPEG file. The decoder stores in internal buffers some information it needs for processing, and particularly the quantization tables and Huffman tables. The decompressed headers are written to the output buffer. All header data is decompressed using the generic decompressor.

The decoder then allocates memory and starts decompressing blocks. Blocks are decompressed in units of blocks. The blocks are the same as described in the encoder details section and match the way JPEG stores blocks. When decompressing a block, the decoder first checks if the block can be copied from the block to the left or the one above. If it can be copied, the decoder copies the block and decompression of that block ends. If the block cannot be copied, decompression of the block continues.

The decoder first decompresses the DC value. DC value decompression starts with calculating a predictor. The predictor is identical to the one calculated by the encoder. Both encoder and decoder use the same function with the same parameter to calculate the predictor.

Next, the decoder extracts the prediction error using the decompressor of the prediction error compressor used by the encoder. The DC value is the predictor plus the prediction error.

In order to decompress the AC values, the decoder uses the same loop as the encoder. First, the decoder decodes the zero flag using the zero/non-zero decompressor. If the value is non-zero, the decoder continues to decode the absolute value of the AC coefficient. The decoder splits AC values like the encoder to top row, left column and the rest. For each case it uses the appropriate decompressor and creates a context based mixed model with contexts identical to the encoder. In order to create the contexts to the mixed model both encoder and decoder use the same function with the same parameters.

Once the absolute value of the AC value has been decoded, the sign of the value is decoded. The sign decompressor uses the same model as with the same contexts as the encoder.

Once the sign has been decoded, it is assigned to the absolute value and the AC value is fully decoded. Once the loop is completed, the post-DCT quantized block has been reconstructed.

Next the block is being zigzag-ed using the standard JPEG zigzag order.

The final step in decoding the block is to use JPEG compression to compress the block. The decoder uses Huffman code to compress the block in the same way as JPEG does. The Huffman tables used are the ones stored in the header.

Once the block has been compressed using the Huffman tables, the JPEG block has been fully reconstructed.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative method steps, processes, decision options, functions, operational features or the like.

Therefore, the above description and illustrations should not be construed as limiting the scope of the invention, which is defined by the appended claims.

An improved method for lossless compression of already compressed data files, involving full or partial decompression of the original file, and re-compression using various advanced data compression techniques. Decompression involves decompression using the advanced data compression techniques and re-compression using the original techniques. This method and system saves on data storage space and allows for the reconstruction of an original compressed file for use in applications that require or support the original compressed format.

What is claimed as invention is:

1. A method of compressing JPEG files, the method comprising the steps of:
    (a) receiving an input JPEG file using an input data unit;
    (b) partially decompressing the JPEG blocks using a JPEG blocks decompressor to the point where quantized blocks are reconstructed;
    (c) compressing the quantized blocks using an image data compressor, wherein, the image data compressor includes a JPEG block compressor and proceeds in a loop using the steps of receiving image data from the decompression of the JPEG blocks from step (b); determining whether the image block can be copied; copying the image block if it can be copied and sending the copied block into output; compressing the DC coefficient using a DC encoder and the AC values using an AC encoder, if the image block cannot be copied; determining whether the end of the image has been reached, applying no further compression if the end of the image has been reached and storing the image block; and compressing the image block further using the JPEG block compressor if the end of the image has not been reached, wherein said compression employs an algorithm more aggressive than and superior to the originally employed compression algorithm, and passing the compressed image block into the output stream; and
    (d) sending the output of step (c) into the data output stream using an output data unit.

2. The method of claim 1, wherein compression of the DC encoder uses a fully predictive technique.

3. The method of claim 2, wherein compressing the DC values comprises the following steps:
predicting the DC value with a calculation based on predictors derived from neighboring blocks;
subtracting the predicted value from the DC coefficient to derive a DC residue;
compressing the DC residue with a DC residual encoder using a context based model.

4. The method of claim 2, wherein compression of the AC values comprises the following steps:
identifying the AC value;
coding the AC value as either a zero or non-zero value using a zero/non-zero compressor; sending the AC value to output if the AC value is zero;
encoding the absolute value of the AC value with an absolute value encoder if the AC value is not zero; and
encoding the sign of the AC value and passing the result to output.

5. The method of claim 4, wherein encoding the AC value with the absolute value encoder employs three compressors, including a first compressor for values in the top row, a second compressor for values in the left column, and a third compressor for the remaining values.

6. The method of claim 1, further including the steps of:
(e) decoding the compressed quantized blocks; and
(f) compressing the quantized blocks using the method employed by the input JPEG file.

7. A method to losslessly compress files compressed by a first compression technique for storage and/or transmission in various file formats, including, but not limited to, GIF and JPEG and their variants, MPEG and its variants, MP3 and its variants, and SIT, ZIP, and GZIP, said method comprising the steps of:
(a) receiving a compressed audio/image file or a video file as an input data file using an input data unit, and fully or partially decompressing the file with a second stage lossless decompressor;
(b) decompressing the file, fully or partially; and
(c) recompressing the decompressed data using a second stage lossless compressor;
wherein the recompressing in step (c) includes processing all input frames in a loop using the steps of determining whether the frame is an I-frame; compressing the I-frame using a JPEG compressor if the frame is an I-frame; passing the compressed I-frame to output; copying the frame if the frame is not an I-frame; and passing the copied frame to output.

8. The method of claim 7, wherein the input data file comprises an archive file containing multiple individually compressed files containing heterogenous file types, and further employing the step of applying block mode compression.

9. The method of claim 8, further including the steps of:
splitting file forks into separate data fork compression streams by using fork at least one fork splitter;
separating the core data types within the separate data fork compression streams into separate data type compression streams;
parsing data type compression streams using file-specific fork parsers;
compressing each core data type; and
grouping data from each file in solid mode with like data types from other files into single blocks;
encoding file details in each block;
selecting optimal compressors for each core data type grouped in each block;
compressing each block using the optimal compressors selected; and
passing the data compressed to a grouped fork output stream.

10. The method of claim 9, further including the step of creating thumbnails for storage with the compressed files in an archived file.

11. The method of claim 7, further including the step of:
decompressing the blocks; and
reading of the details of the files in each block; and
reconstructing the original files using the file details.

12. The method of claim 8, further including the steps of:
decompressing compressed blocks;
reading the details of the block separation from the input stream; and
reconstructing the original file using the details of the block separation.

13. The method of claim 7, further including the steps of:
(d) decompressing the file compressed by the compression technique applied in step (b); and
(e) reconstructing the file by compressing the file using the first compression technique.

* * * * *